United States Patent
Pentith

[15] 3,647,265
[45] Mar. 7, 1972

[54] CUTTING HEADS
[72] Inventor: Gerald R. O. Pentith, Winston, Nr. Darlington, England
[73] Assignee: Greenside Machine Company, Limited, Durham, England
[22] Filed: July 31, 1970
[21] Appl. No.: 60,076

[52] U.S. Cl. ............................................. 299/90, 175/411
[51] Int. Cl. ...................................................... E21c 25/10
[58] Field of Search ................. 299/87, 88, 89, 90; 175/409, 175/411

[56] References Cited

UNITED STATES PATENTS

| | | | |
|---|---|---|---|
| 2,801,838 | 8/1957 | Bradley | 299/89 |
| 3,558,194 | 1/1971 | Renzing et al. | 299/87 |

*Primary Examiner*—Ernest R. Purser
*Attorney*—Watson, Cole, Grindle & Watson

[57] ABSTRACT

A rotary drum-type cutting head for use with, for example, mining and tunnelling machines, comprises a cylindrical drum to the periphery of which are secured a number of arcuate segments provided with pick boxes for the reception of picks.

7 Claims, 2 Drawing Figures

3,647,265

CUTTING HEADS

BACKGROUND OF INVENTION

This invention relates to a rotary drum-type cutting head for use, for example, with tunnelling and mineral winning machines, and having a peripheral outer surface provided with pick-boxes for mounting a plurality of picks.

The cylindrical outer surface of the known cutting heads of this type is generally constituted by a drum made in one piece. This results in increases in costs in the case where the drum or the pick-boxes welded to the drum are damaged and have to be replaced.

The object of the present invention is to construct the cutting head in such a way that repairs can be made rapidly and easily.

It has been proposed in the past to assemble a cutting head from a series of fully cylindrical rings which are bolted together side-by-side. The construction of such rings is inevitably costly and the innermost rings cannot be removed and replaced without first removing the outer ones. Each of the rings must, of course, be firmly bolted to a support member and in consequence disassembly of such a cutter head for repair is not easily carried out.

Disc cutters have been proposed which comprise a thin disc with a series of pick-receiving arcuate elements mounted on its rim. Such an element may be held in position by means of spaced radially inwardly directed flanges which straddle the rim and are bolted to it. Some sort of construction such as this is necessary if the edge of a thin disc is to be provided with picks, but it has no application in the case of a drum-type cutting head. In the latter case, the drum is very wide in the axial direction and the picks lie in several axially spaced rows, possibly in a helical formation.

It is also known for tunnel-driving shields having a cylindrical outer wall carrying cutting surfaces to be constructed from sections. Such a construction is customary in the case of large diameter tubular structures used for any purposes. It is not adapted to facilitate dismantling and repair because such shields cannot be dismantled while underground.

None of the prior art, therefore, points the way to a present solution to the shortcomings of the known drum-type cutting heads.

SUMMARY OF THE INVENTION

An object of the present invention is to provide a drum type cutting head which may be repaired cheaply and easily. In accordance with the invention, the outer surface of the cutting head is prefabricated from a plurality of interconnected part cylindrical platelike segments forming a shell on which a plurality of pick-boxes are fixedly mounted, the segments being fixed in position on the surface of a drum driven from the machine.

To hold the segments firmly in place, each segment may be provided with a flange which extends radially inwardly adjacent one circumferentially extending edge, and which is secured to a cooperating flange extending inwardly at a corresponding edge of the drum. Each segment may also be provided with upstanding flanges along its axially extending edges, each of which flanges is secured to the abutting flange of the next adjacent segment.

In order to provide a cutting head which is capable of being sumped axially into a rock face, as is necessary if the cutting head is to be used in a tunnelling machine the cutting head may be provided with circular front plate bearing pick-mounting means on its front face, and being secured to the radially inwardly extending flanges of the drum and segments. By constructing the flange extending inwardly of the drum in a number of parts, each part cooperating with the flange of a respective one of the segments, gaps can be provided between the adjacent flanges, and can receive location keys provided at the edge of the front plate. By setting the radially inwardly extending flange of the segments at a distance inwardly of their circumferentially extending edges, a recess is provided for receiving the front plate, such that its front face is flush with the edges of the segments.

DESCRIPTION OF PREFERRED EMBODIMENT

Figure 1:
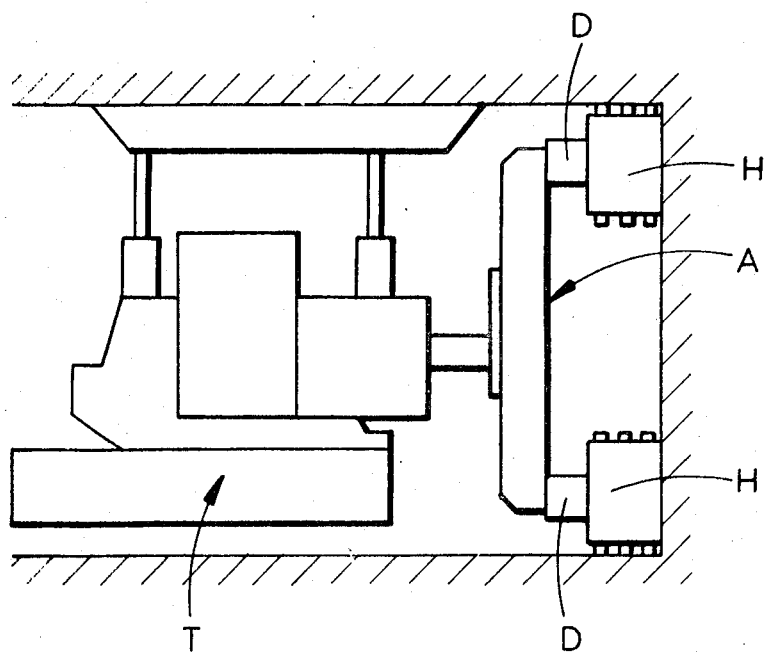
FIG. 1 is a diagrammatic side elevation of a part of a tunnelling machine incorporating a pair of cutting heads, and,
FIG. 2 is an exploded view of one of said cutting heads.

As shown in FIG. 1, a tunnelling machine T includes a rotatable arm A mounting drive means D for driving rotary cutting heads H bearing picks P on their peripheral and forward surfaces.

Figure 2:
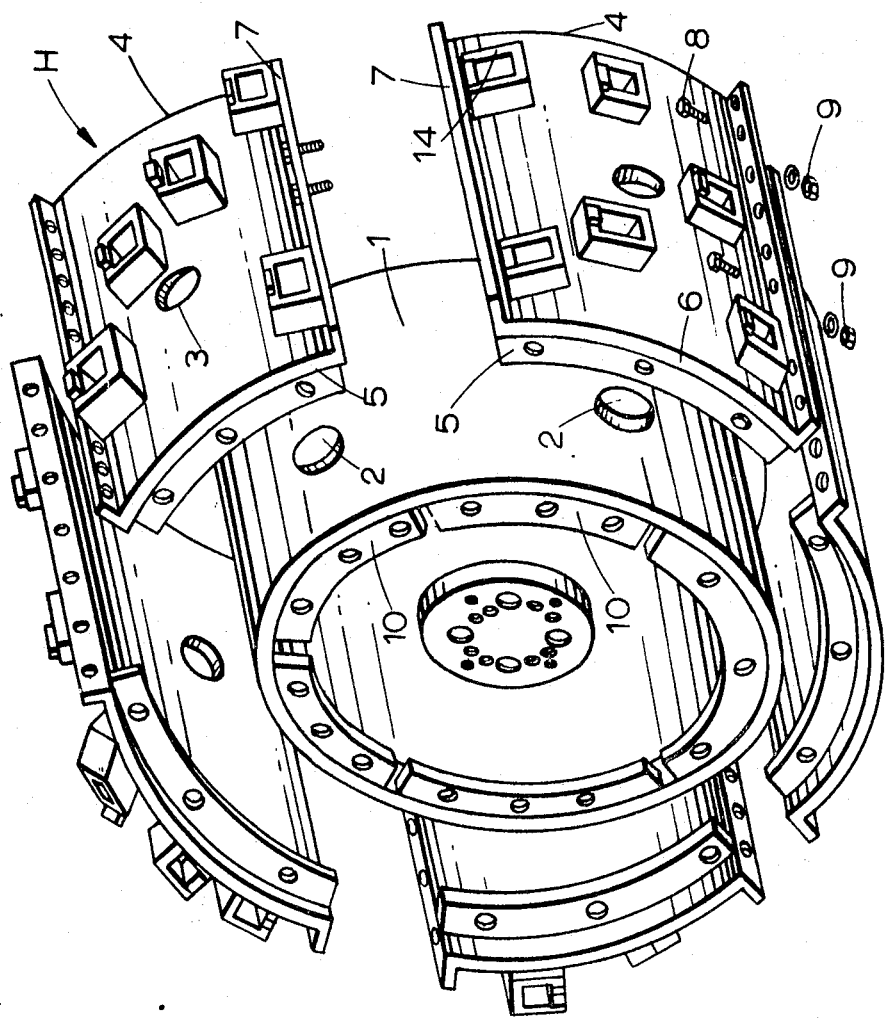

To facilitate assembly and disassembly of the cutting heads, each is prefabricated. As shown in FIG. 2, each cutting head comprises a drum 1 drivably connectable with the drive means D and having a cylindrical peripheral surface provided with locating spigots 2. Each spigot is received in a locating opening 3 of a respective segment 4.

Each segment is arcuate and has on its inner surface a flange 5 which is spaced from the forward, circumferentially extending edge 6 of the segment and extends radially inwardly. Upstanding flanges 7 extend along the axially extending edges of each segment.

When the cutting head is assembled, the flanges 7 of adjacent segments cooperate and are secured together with butts 8 which pass through registering holdes and have threaded into them nuts 9. The flanges 5 overlie respective flanges 10 extending radially inwardly of the drum, the flanges 10 being separated by gaps, into which penetrate location keys 11 of a front plate 12. The front plate is fitted, when the cutting head is assembled, into the recess defined between the flanges 5 and the edges 6 of the segments. The front plate, flanges 5 and flanges 10 are secured together by bolts 13 which pass through the plate and flanges 5 and screw into screw-threading bores in the flange 10.

The outer surfaces of the plate and the segments have welded to them a plurality of pick boxes 14, arranged in any desired pattern.

It will be appreciated that the construction described above is a simplifies construction and assembly of the cutting head, and also permits replacement of any segment which has become damaged, or has suffered damage to its pick boxes.

Although the cutting head described above is provided with a pick-mounting front plate, the construction can be modified in this respect if the cutting head is not intended to sump axially into the face to be worked, but is intended for example, simply to perform a planing action across a surface, as in the case of road working machinery. Furthermore, the invention is intended to embrace affirmative arrangements for mounting the picks. Thus, for example, the provision of pick receiving boxes in the segment falls within the scope of the invention. Furthermore, the cutting head need not be cylindrical, conical cutting heads also being understood to fall within the scope of the invention. Modifications may thus be made within the spirit and scope of the invention.

What I claim is:
1. A tunnelling or mineral mining machine, comprising: an arm rotatable about an axis extending longitudinally of said arm, means on said arm for driving at least one cutting head, said at least one cutting head comprising a drum having a peripheral surface formed from a plurality of part cylindrical interconnected platelike segments bearing cutting picks, each said segment has upstanding axially extending flanges, each said flange is secured to the corresponding abutting flange of the next adjacent segment, and a front surface formed from a detachable pick-bearing front plate.
2. A rotary drum-type cutting head, comprising: a drum having an arcuate peripheral surface; a plurality of part cylindrical, platelike segments on which the pick boxes are mounted; said segments are interconnected and fixed in position on the outer surface of said drum so as to form a shell thereon; each segment has upstanding axially extending flanges, and each said flange is secured to the corresponding abutting flange of the next adjacent segment.

3. A cutting head as claimed in claim 2, wherein said drum has a cylindrical outer surface provided with projections and said segments have holes interengaging with said projections.

4. A cutting head as claimed in claim 3, wherein each said segment has a flange which extends radially inwards adjacent one circumferential edge and said drum has a flange secured to the flanges of said segments.

5. A cutting head as claimed in claim 4, wherein a substantially circular pick-box bearing front plate is secured to the radially inwardly directed flanges of said segments and said drum respectively.

6. A cutting head as claimed in claim 5, wherein said radially inwardly directed flanges of said segments are set back from the edges thereof to provide a recess to receive said front plate.

7. A cutting head as claimed in claim 6, wherein said front plate is provided with keys engageable in gaps between adjacent flanges of said segments.

* * * * *